United States Patent [19]
Lyon

[11] Patent Number: 5,431,498
[45] Date of Patent: Jul. 11, 1995

[54] LINEAR MOTION BEARING

[75] Inventor: Gregory S. Lyon, Mamaroneck, N.Y.

[73] Assignee: Thomson Industries, Inc., Fort Washington, N.Y.

[21] Appl. No.: 225,605

[22] Filed: Apr. 11, 1994

[51] Int. Cl.[6] .............................................. F16C 29/06
[52] U.S. Cl. ................................................... 384/45
[58] Field of Search ........................ 384/43, 44, 45, 57

[56] References Cited

U.S. PATENT DOCUMENTS

| | | |
|---|---|---|
| 3,900,233 | 8/1975 | Thomson . |
| 4,025,995 | 5/1977 | Thomson . |
| 4,030,191 | 6/1977 | Ernst et al. . |
| 4,420,193 | 12/1983 | Teramachi . |
| 4,515,413 | 5/1985 | Teramachi . |
| 4,527,841 | 7/1985 | Teramachi . |
| 4,531,788 | 7/1985 | Teramachi . |
| 4,576,420 | 3/1986 | Lehmann et al. . |
| 4,576,421 | 3/1986 | Teramachi . |
| 4,611,861 | 9/1986 | Haruyama ............... 384/49 |
| 4,637,739 | 1/1987 | Hattori .................... 384/45 |
| 4,674,893 | 6/1987 | Teramachi ............... 384/45 |
| 4,692,039 | 9/1987 | Teramachi ............... 384/45 |
| 4,775,247 | 10/1988 | Isert ....................... 384/43 |
| 4,798,479 | 1/1989 | Morita .................... 384/45 |
| 4,869,600 | 9/1989 | Tonongai ................ 384/43 |
| 4,932,067 | 6/1990 | Pester et al. ........... 384/45 |
| 4,932,279 | 6/1990 | Kasuga ................... 384/45 X |
| 4,983,049 | 1/1991 | Lecomte ................. 384/45 |
| 5,013,164 | 5/1991 | Tsukada ................. 384/45 |
| 5,059,037 | 10/1991 | Albert .................... 384/45 |
| 5,067,823 | 11/1991 | Kasuga ................... 384/45 |
| 5,116,141 | 5/1992 | Chitayat ................. 384/17 |
| 5,156,195 | 10/1992 | Wehler et al. .......... 160/202 |
| 5,161,896 | 11/1992 | Höfling et al. ......... 384/8 |
| 5,176,454 | 1/1993 | Schlereth ............... 384/45 |
| 5,195,391 | 3/1993 | Barbat et al. .......... 384/45 X |
| 5,201,584 | 4/1993 | Simons ................... 384/49 |
| 5,207,510 | 5/1993 | Polyak ................... 384/43 |
| 5,211,279 | 5/1993 | Abbestam et al. ..... 384/55 X |
| 5,217,308 | 6/1993 | Schroeder .............. 384/45 |
| 5,232,288 | 8/1993 | Mottate .................. 384/45 |

Primary Examiner—Thomas R. Hannon
Attorney, Agent, or Firm—Dilworth & Barrese

[57] ABSTRACT

A linear motion bearing assembly is provided having a rail assembly with a flexible base portion and a bearing carriage assembly with flexibly depending legs configured for longitudinal movement along the rail assembly on rolling elements. A plurality of load bearing inserts are positioned on the rail assembly and/or carriage assembly and define load bearing tracks with rolling elements therebetween. The flexible rail and carriage assemblies permit optimization of the contact angle between the load bearing inserts and the rolling elements when the linear motion bearing assembly is under load.

18 Claims, 5 Drawing Sheets

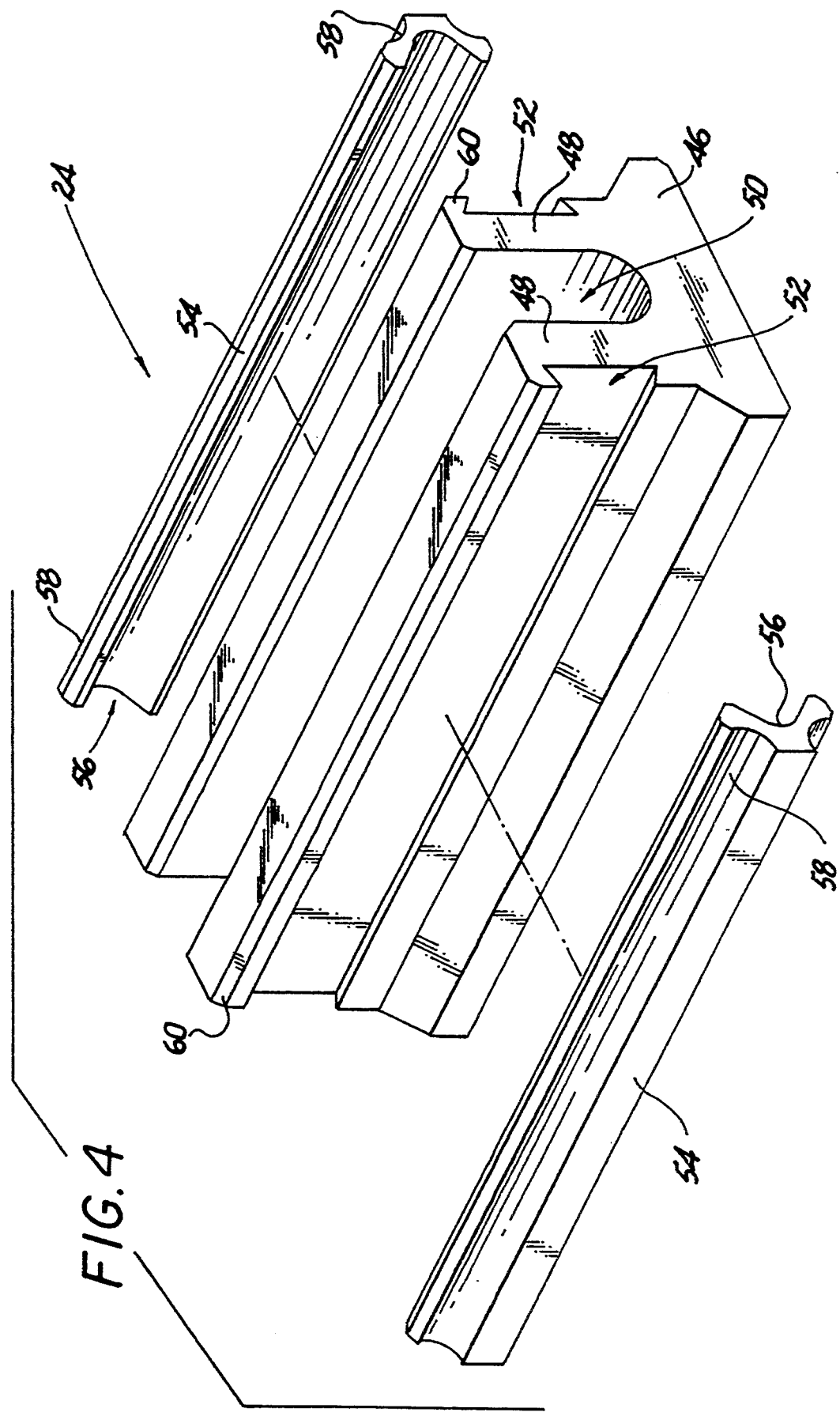

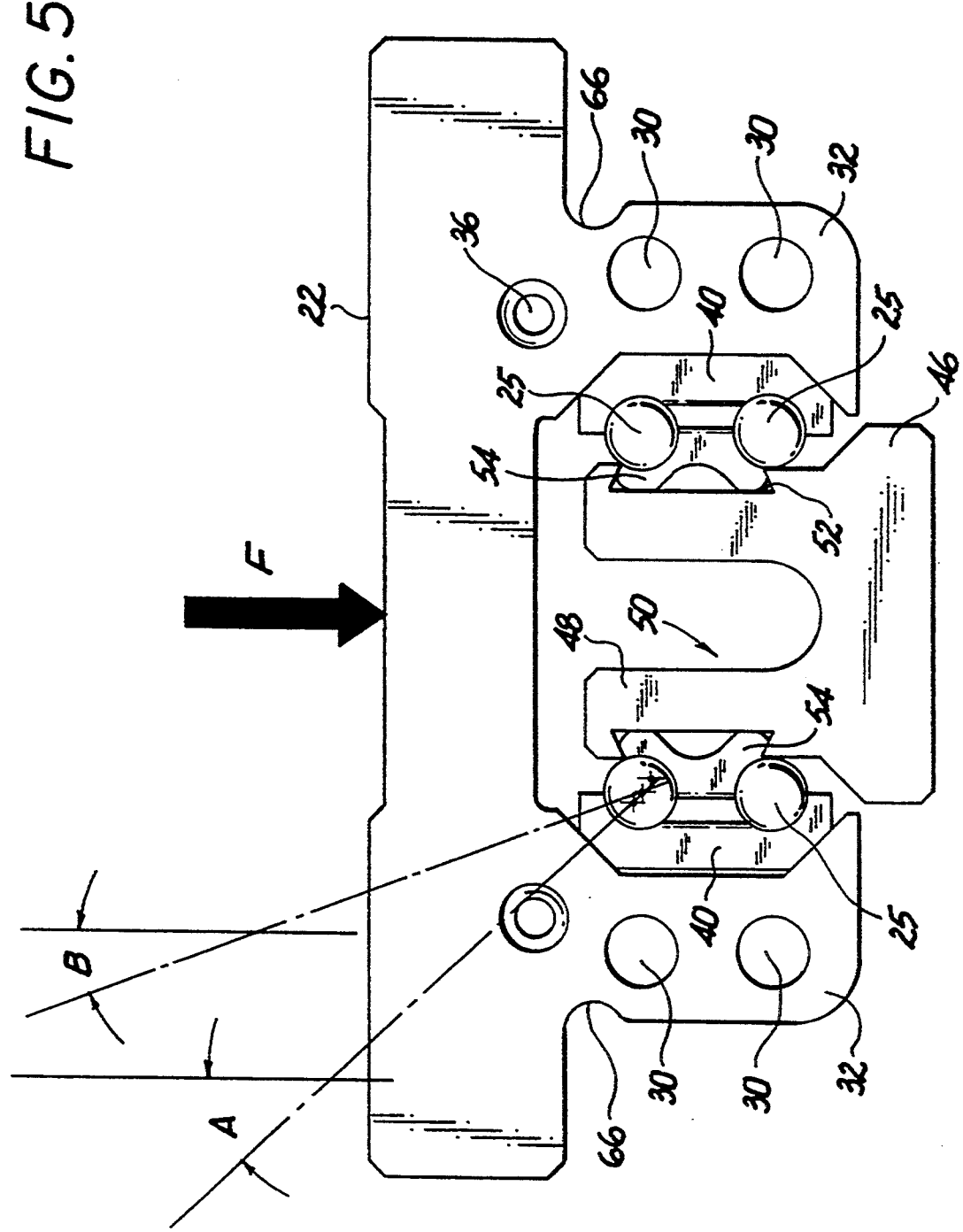

LINEAR MOTION BEARING

BACKGROUND OF THE INVENTION

1. Field of the Invention

The present invention relates to anti-friction linear motion bearings and, more particularly, to linear motion bearing assemblies which facilitate ease of manufacture and installation while effecting optimization of contact angle with the rolling elements.

2. Description of the Related Art

Linear motion bearing assemblies are well known in the art and are used extensively in a wide variety of machines, machine tools, transfer systems and other equipment where machine elements move with respect to one another. These assemblies typically include a bearing carriage mounted for movement along a modified Y-beam, I-beam or T-beam shaped rail. Load bearing and return tracks are provided in association with the bearing carriage for a plurality of recirculating rolling elements such as, for example, balls or rollers. These rolling elements travel alternately through the load bearing tracks and return tracks to facilitate movement of the bearing carriage along the rail with minimum friction.

End caps are usually located on the ends of the bearing carriage and may have turnarounds formed therein for transferring the rolling elements from the load bearing tracks to the return tracks. The turnarounds typically comprise a semi-toroidal shaped track dimensioned and configured for the particular rolling element being employed. At the center of the semi-toroid, an internal guide may be provided to smooth the movement of the rolling elements in the turnarounds.

The return tracks typically take the form of bores or channels conforming in size to the dimensions of the rolling elements which are cut or drilled into the depending legs of the bearing carriage. See, for example, U.S. Pat. No. 4,932,067 to Pester et al. The overall structure of this type of linear motion bearing assembly typically requires the extensive use of expensive high quality bearing steel in order to yield a bearing of sufficient strength and longevity. This is at least partially necessitated by the fact that load bearing portions require the strength and rigidity of bearing steel and are usually monolithically formed directly in the structure of the bearing carriage and/or the rail. See, for example, U.S. Pat. No. 4,637,739 to Hattori. Fabrication of the rails and/or carriages from such material requires numerous precision machining steps as well as hardening processes on designated areas such as, for example, the contact portions of the load bearing tracks in both the carriage and the rail. This process is extremely costly and, depending on the bearing assembly structure, requires elaborate and expensive machining equipment. In addition, one characteristic of high quality bearing steel is its rigidity. This characteristic results in a requirement for extreme precision in grinding the load bearing tracks and highly accurate installation of the linear motion bearing assembly to avoid overly stressing the contact portions.

Attempts have been made in the past to isolate the highly stressed contact points within the linear motion bearing assemblies by providing inserts which are mounted to conventional rail or carriage structure. See, for example, U.S. Pat. Nos. 3,900,233 and 4,025,995 to Thomson. Load bearing track inserts are also shown in U.S. Pat. Nos. 4,515,413, 4,527,841, 4,531,788 and 4,576,421 to Teramachi and U.S. Pat. No. 4,576,420 to Lehmann et al. However, these linear motion bearings do not address or overcome the inherent rigidity problem characteristic of these materials. Thus, extreme precision and accurate placement are still very definite factors affecting the operation and longevity of the linear motion bearing assembly.

Attempts have also been made in the past to reduce this inherent rigidity of structures formed entirely of high quality bearing steel. For example, U.S. Pat. No. 5,217,308 to Schroeder discloses an internal carriage structure for a linear motion bearing assembly. The carriage is configured to be supported within a frame structure by four inward facing steel raceways mounted to the frame structure. The frame structure is constructed of aluminum and is configured to allow for flexure of the upper races to take up clearances within the assembly.

Therefore, it would be highly desirable to have an easily manufactured linear motion bearing assembly which reduces the need for extensive precision drilling, hardening and/or grinding of contacting surfaces on the carriage and on the rail while providing a dependable bearing assembly which is capable of a high degree of flexural movement when placed under load to optimize the contact angle of the rolling elements in the load bearing tracks.

Accordingly, it is one object of the present invention to provide an easily manufactured linear motion bearing assembly which minimizes the use of expensive high quality bearing steel while providing the capability of optimizing the contact angle of the rolling elements and load bearing tracks.

It is a further object of the present invention to provide a linear motion bearing wherein the contacting load bearing portions of the carriage and rail are formed of high quality steel inserts which are fitted into relatively flexible carrier structure.

It is also an object of the present invention to provide a reliable linear motion bearing assembly which can be easily fabricated with a minimum of bearing steel elements without the need for precision grinding and hardening directly on the carriage block and/or rail.

These and other highly desirable objects are accomplished by the present invention in a linear motion bearing having bearing steel track inserts fitted into the depending legs of the bearing carriage and the rail. The balance of the bearing assembly is constructed of more flexible material such as, for example, machine grade aluminum, plastics or less expensive grades of steel to facilitate easy and accurate assembly of the linear motion bearing assembly. The parts are configured without the need for precision grinding or hardening of tracks directly on the carriage and/or rail.

Objects and advantages of the invention are set forth in part herein and in part will be obvious therefrom, or may be learned by practice with the invention, which is realized and attained by means of the instrumentalities and combinations pointed out in the appended claims. The invention consists of novel parts, constructions, arrangements, combinations, steps and improvements herein shown and described.

SUMMARY OF THE INVENTION

In accordance with the present invention, there is provided a linear motion bearing having load bearing tracks formed of high quality bearing steel load bearing track inserts mounted in the bearing carriage assembly and/or the rail assembly. Axial grooves are also formed in both the bearing carriage assembly and/or the rail assembly to optimize the contact angle of the rolling elements under load. This construction simplifies manufacture and avoids the need for difficult and expensive grinding and hardening of load bearing tracks directly on the bearing carriage and rail.

Further, less expensive materials of construction such as, for example, aluminum, plastic or non-bearing quality steel may be used to mount the inserts. The material of construction may also be selected based on its desirable flexural characteristics without being constrained to the use of relatively rigid high quality bearing steel.

This structure provides an inexpensive and dependable linear motion bearing assembly that is easy to fabricate, assemble and install.

BRIEF DESCRIPTION OF THE DRAWINGS

The accompanying drawings, referred to herein and constituting a part hereof, illustrate the preferred embodiments of the apparatus of the present invention, and, together with the description, serve to explain the principles of the invention.

FIG. 4 is a perspective view with parts separated of the rail assembly of the linear motion bearing assembly of FIG. 1.

FIG. 5 is an end view with the end cap removed of the assembled linear motion bearing assembly of FIG. 1.

DETAILED DESCRIPTION OF PREFERRED EMBODIMENTS

Figure 1:
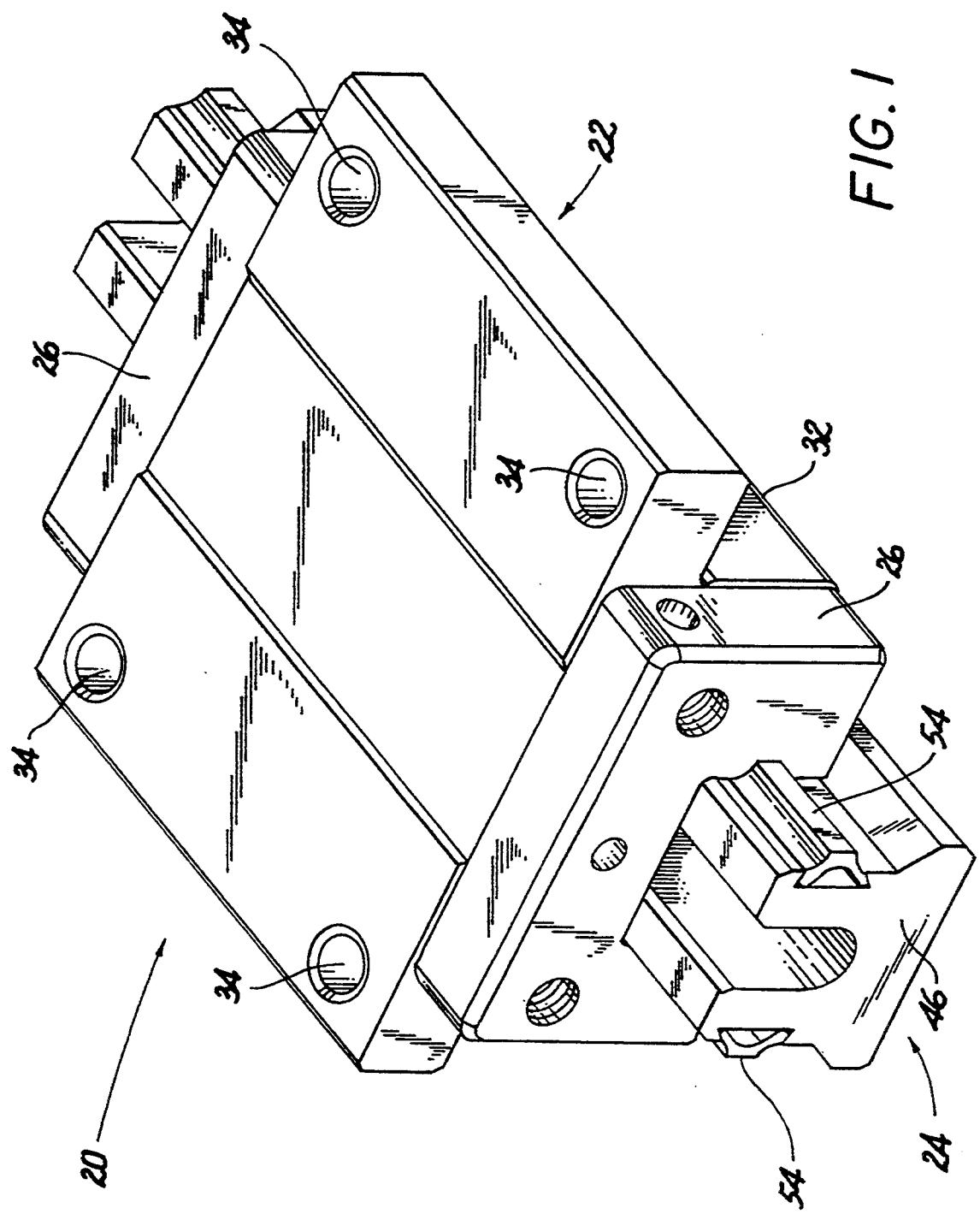
FIG. 1 is a perspective view of an assembled linear motion bearing assembly in accordance with a preferred embodiment of the present invention.
Figure 2:
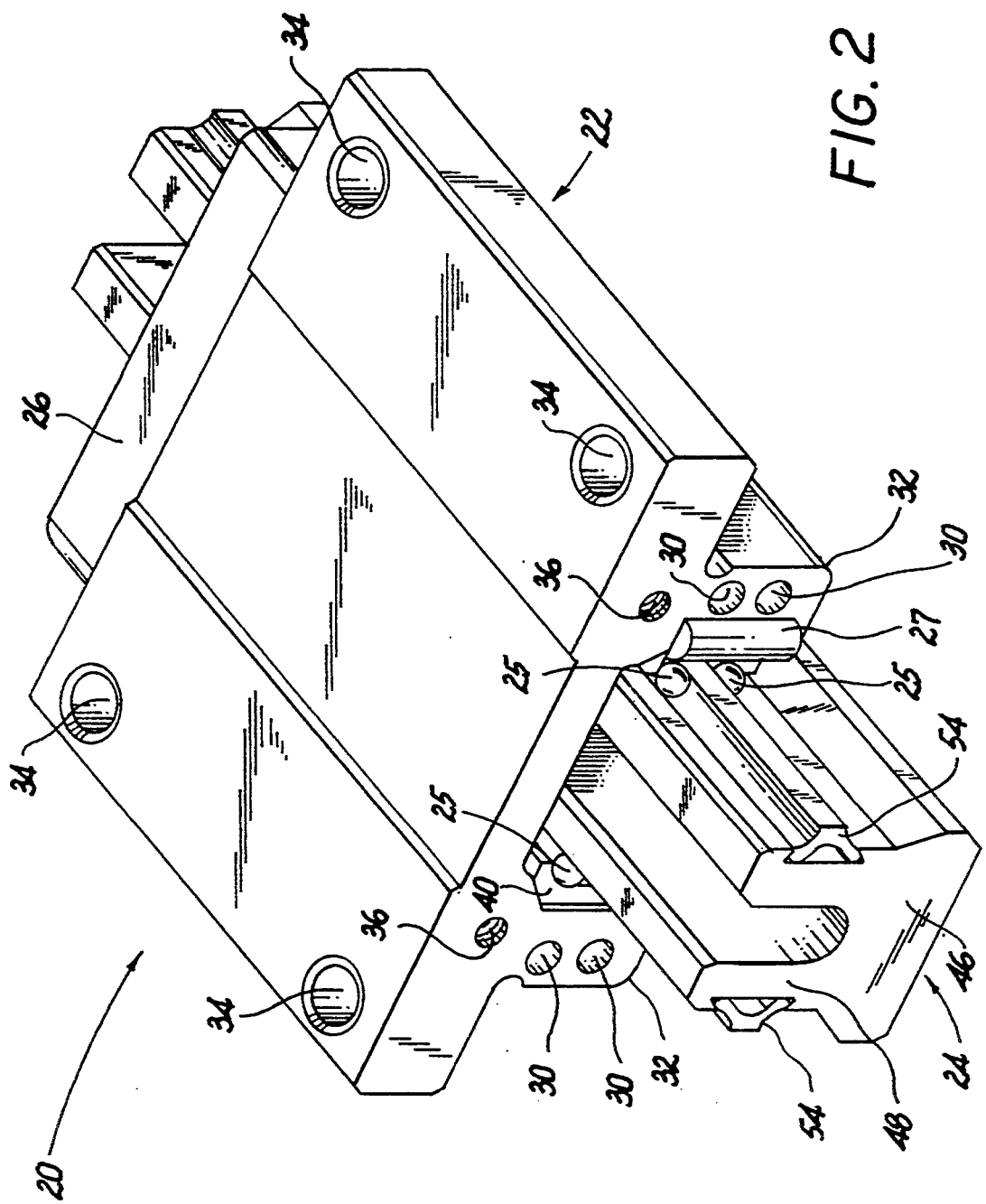
FIG. 2 is a perspective view similar to FIG. 1 with one of the carriage end caps removed.

Referring now to the drawings in detail, and initially to FIGS. 1 and 2, a fully assembled linear motion bearing assembly 20 in accordance with the present invention is shown. The assembly includes an inverted substantially U-shaped bearing carriage 22 configured and dimensioned to move along a rail assembly 24 on rolling elements 25. Although shown here as balls, other rolling elements are also contemplated including rollers. End caps 26 are positioned on each longitudinal end of the bearing carriage 22. The end caps 26 include semitorridal turnarounds 29 integrally formed in each of the end caps 26 and serve to enclose and connect corresponding load bearing and return tracks, 28 and 30 respectively, located in depending legs 32 of the bearing carriage 22. As best seen in FIG. 2, return tracks 30 comprise parallel longitudinal bores drilled axially through the depending legs 32 of the bearing carriage 22. Mounting holes 34 are formed in the upper planar surface of the bearing carriage 22 and facilitate engagement of the bearing assembly to desired machinery components. Longitudinal mounting bores 36 are formed in each longitudinal end face of the bearing carriage 22 and serve to attach end caps 26. Inner guides 27 are positioned between the ends of the load bearing tracks 28 and return tracks 30. These inner guides 27 ease the movement of the rolling elements 25 between the respective tracks.

Figure 3:
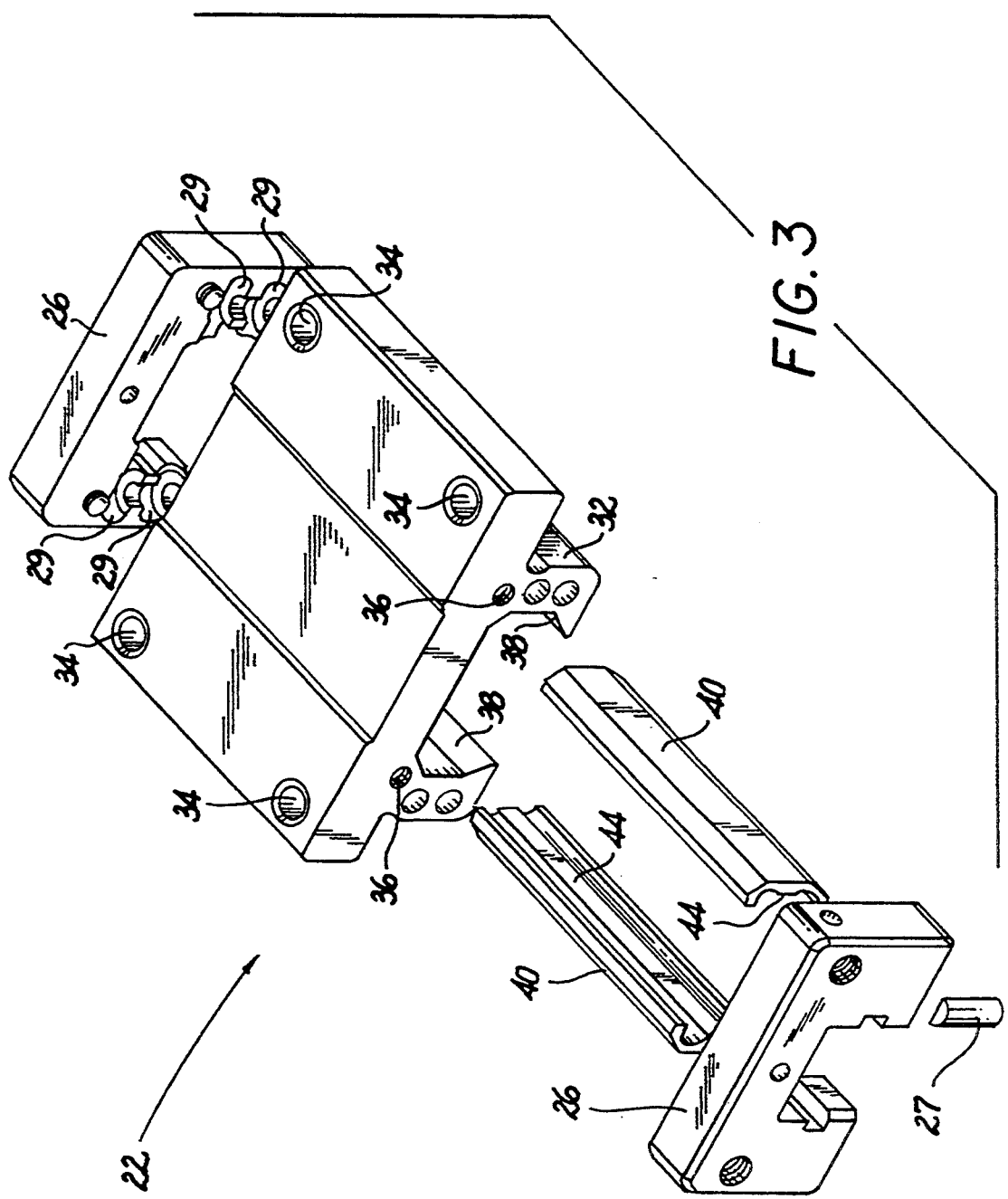
FIG. 3 is a perspective view with parts separated of the carriage of the linear motion bearing assembly in FIG. 1.

Referring now to FIG. 3, the individual components of the bearing carriage 22 are shown in detail. The bearing carriage 22 is preferably formed of a relatively flexible machine grade material such as, for example, aluminum, plastic or steel. The interior facing surfaces 38 of depending legs 32 are configured and dimensioned to receive load bearing track inserts 40. These inserts 40 are formed of a high quality bearing steel and include a pair of parallel grooves 42 formed in an inner face 44. These grooves 42 make up a portion of the load bearing tracks 28 and are configured and dimensioned in an appropriate cross-sectional shape to conform to the rolling elements 25 employed in the bearing assembly 22.

The load bearing track inserts 40 can be easily and efficiently formed in long sections by known cold drawing processes and subsequently cut to the desired length prior to assembly. To facilitate manufacture, the cross-sectional area of the load bearing track inserts is preferably substantially uniform in thickness. Depending legs 32 are further provided with a longitudinal relief 66 on an outer surface thereof adjacent the intersection of the depending legs 32 with the remainder of the carriage 22. This relief 66 provides additional flexural characteristics to the depending legs 32 as discussed below.

With reference to FIG. 4, the rail assembly 24 in accordance with a preferred embodiment of the present invention includes a substantially U-shaped base member 46 formed of a machine grade aluminum and is extruded using known production techniques. The base member 46 includes a pair of parallel vertical arms 48 defining an axial groove 50 along the longitudinal length of the base member 46. This configuration provides an advantageous degree of flexibility to the vertical arms 48.

Dove-tailed channels 52 are formed in opposed sides of vertical arms 48 substantially parallel to axial groove 50. A load bearing track insert 54 is configured and dimensioned to fit within each of the channels 52 and defines a portion of load bearing tracks 28. As in the carriage load bearing track inserts 40 discussed above, rail load bearing track inserts 54 are produced from a high quality hardenable bearing steel using known cold drawing processes. The inserts are hardened in line by known techniques such as, for example, induction heating and quench.

The inserts 54 are preferably formed with a longitudinal relief 56 on an inner surface thereof. This relief 56 gives the insert 54 a degree of flexibility which enhances its final assembly to the rail. The inserts 54 preferably have a substantially uniform thickness in cross-section and include parallel load bearing grooves 58.

The load bearing track inserts 54 are easily mounted to the base member 46 by configuring the relative dimensions of dove-tailed channels 52 and insert 54 such that the inserts fit into the channels with some clearance. The upper flange 60 of the channel 52 is plastically deformed over the uppermost portion of the insert 54, effectively locking it into place on the base member 46. During this plastic deformation process, the insert 54 will deform, much as a spring, by virtue of the shape and design of the longitudinal relief 56. The tendency of the insert 54 to return to its original unstressed configuration produces a secure connection between the insert 54 and the base 46.

Referring to FIG. 5, the advantageous features of this construction are graphically presented. With the application of a load or force "F" in the direction of the arrow, load is transmitted through the carriage 22, load bearing tracks 28, and rolling elements to the fixed rail assembly 24. Axial groove 50 formed in the base member 46 allows the rail assembly to deform in response to the applied load. This allows for the correct compliance and orientation of each of the vertical arms 48 and allow for translation of the carriage load bearing track centerline 62. As this centerline 62 moves with respect to the rail load bearing centerline 64, the angle of contact rotates from its initial position represented by angle "A" to its loaded position represented by angle "B". Since the final angle "B" is more aligned with the orientation of the applied load, the contact angle is effectively optimized.

Where a load is applied in an opposite direction, i.e. a "lift-off" force, a similar reaction occurs. Because the carriage is formed of a relatively flexible material such as, for example, aluminum, the depending legs 32 can flex outward to again optimize the contact angle. In addition, relief 66 referred to above, may be formed on the outer opposing surfaces of the depending legs 32 at the intersection between the legs 32 and the carriage 22. This relief 66 provides a flexure line for allowing realignment and/or reorientation of the carriage load bearing track portions formed in insert 40.

In addition to the optimization of contact angle provided by this construction, the manufacture and assembly of this linear motion bearing assembly is greatly simplified over the prior art. This results from the optimizing compliance described above that allows the use of materials, processes and tolerances that are much less costly than those in existing product manufacture.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A linear motion bearing assembly comprising:
    a rail assembly including an elongate base member having a pair of substantially vertical arms, said vertical arms having respective inner surfaces and outer surfaces, said vertical arms being flexible with respect to said base member;
    a bearing carriage assembly including a bearing carriage, a pair of depending legs extending therefrom, said depending legs having respective facing and opposing sides, said facing sides defining a longitudinal channel for accommodating said rail assembly, said depending legs being flexible with respect to said bearing carriage;
    a plurality of load bearing inserts, each of said inserts defining a portion of at least one load bearing track thereon, said inserts being positionable on said facing sides of said depending legs to define a plurality of load bearing tracks between said vertical arms and said depending legs; and
    a plurality of rolling elements disposed in said load bearing tracks.

2. A linear motion bearing assembly as in claim 1, wherein said load bearing inserts each contain a plurality of parallel grooves defining a portion of a plurality of load bearing tracks.

3. A linear motion bearing assembly as in claim 1, further comprising a pair of longitudinal reliefs formed adjacent one end of said depending legs, said reliefs effecting a narrowing of the cross sectional area of said depending legs to facilitate the flexural characteristics thereof.

4. A linear motion bearing assembly as in claim 1, further comprising a plurality of load bearing inserts, each of said inserts defining a portion of at least one load bearing track thereon, said inserts being positionable on said outer surfaces of said vertical arms.

5. A linear motion bearing assembly as in claim 1, wherein said bearing carriage is fabricated from a machine grade material selected from the group consisting of aluminum, plastic and steel.

6. A linear motion bearing assembly as in claim 1, wherein said base member of said rail assembly is fabricated from a machine grade material selected from the group consisting of aluminum, plastic and steel.

7. A linear motion bearing assembly as in claim 1, wherein two of said load bearing inserts are positioned in said bearing carriage and two of said load bearing inserts are positioned in said rail assembly.

8. A linear motion bearing assembly as in claim 7, wherein each of said two load bearing inserts positioned in said rail assembly further include a longitudinal groove formed in a face adjacent said outer surfaces of said vertical arms, said longitudinal groove enhancing transverse flexibility to said inserts.

9. A linear motion bearing assembly as in claim 1, wherein said load bearing inserts each contain at least one groove defining a portion of a plurality of load bearing tracks.

10. A linear motion bearing assembly comprising:
    an elongate rail assembly including an aluminum base member having a pair of substantially parallel arm members extending the longitudinal length of said rail assembly, said arm members having respective inner surfaces and outer surfaces, said inner surfaces defining a longitudinal groove, said outer surfaces defining rail assembly insert receiving structure;
    a plurality of rail assembly load bearing inserts, said inserts having an outer surface and an inner surface, said outer surface having a plurality of parallel grooves formed therein defining a portion of a plurality of load bearing tracks, said rail assembly load bearing inserts being disposed in said insert receiving structure formed in the outer surfaces of said parallel arm members;
    a bearing carriage assembly including an aluminum bearing carriage, a pair of depending legs extending therefrom, said depending legs having respective facing and opposing sides, said facing sides defining a longitudinal channel for accommodating said rail assembly, said facing sides further including carriage assembly insert receiving structure;
    a plurality of carriage load bearing inserts, each of said inserts including a plurality of parallel grooves formed therein defining a portion of a plurality of load bearing tracks, said carriage load bearing inserts being disposed in said carriage assembly insert receiving structure of said facing sides of said depending legs; and
    a plurality of rolling elements disposed in said load bearing tracks such that upon loading of the bearing carriage assembly, the load bearing inserts are flexible into an optimized contact angle with respect to said rolling elements.

11. A linear motion bearing assembly as in claim 10, wherein said rail assembly load bearing inserts include a longitudinal groove formed on an inner surface thereof, said longitudinal groove enhancing flexibility of said inserts.

12. A linear motion bearing assembly as in claim 10, wherein said rolling elements are balls.

13. A linear motion bearing assembly as in claim 10 wherein said rail assembly insert receiving structure is a longitudinal groove configured and dimensioned to receive and retain said rail assembly load bearing inserts.

14. A linear motion bearing assembly comprising:
a rail assembly including a base member having a pair of arm members extending the longitudinal length of said rail assembly, said arm members having respective inner surfaces and outer surfaces, said inner surfaces defining a longitudinal groove, said outer surfaces defining rail assembly insert receiving structure;
a plurality of rail assembly load bearing inserts, said inserts having an outer surface and an inner surface, said outer surface having at least one groove formed therein defining a portion of a plurality of loading bearing tracks, said rail assembly load bearing inserts being disposed in said insert receiving structure formed in the outer surfaces of said arm members;
a bearing carriage assembly including a bearing carriage, a pair of depending legs extending therefrom, said depending legs having respective facing and opposing sides, said facing sides defining a longitudinal channel for accommodating said rail assembly, said facing sides further including carriage assembly insert receiving structure;
a plurality of carriage load bearing inserts, each of said inserts including at least one groove formed therein defining a portion of a plurality of load bearing tracks, said carriage load bearing inserts being disposed in said carriage assembly insert receiving structure of said facing sides of said depending legs; and
a plurality of rolling elements disposed in said load bearing tracks.

15. A linear motion bearing assembly as in claim 14, wherein said base member of said rail assembly is made of aluminum.

16. A linear motion bearing assembly as in claim 14, wherein said bearing carriage of said bearing carriage assembly is made of aluminum.

17. A linear motion bearing assembly as in claim 14, wherein said rail assembly load bearing inserts include a longitudinal groove formed on an inner surface thereof.

18. A linear motion bearing assembly as in claim 14, wherein said load bearing inserts each contain a plurality of substantially parallel grooves defining a portion of a plurality of load bearing tracks.

* * * * *